UNITED STATES PATENT OFFICE 2,429,095

PRIMARY AMINOARYL MERCAPTANS AND DI-(PRIMARY AMINOARYL) DISULFIDES AS FUNGICIDES

Elbert C. Ladd, Passaic, N. J., assignor to United States Rubber Company, New York, N. Y., a corporation of New Jersey No Drawing. Application February 9, 1945, Serial No. 577,129

17 Claims. (Cl. 167—30)

This invention relates to new and useful improvements in fungicides. The invention further relates to methods of treating plants, and to methods of protecting organic material subject to attack by fungi, as the immunizing of seed, and the mildewproofing of fabrics and other material.

I have found that primary aminoaryl mercaptans and di(primary aminoaryl) disulfides of the benzene and naphthalene series, including the salts of such mercaptans, and the acid-addition products and ring-halogen substitution products of such mercaptans and disulfides are effective fungicides. The present preferred chemical is 2,2'-dithiodianiline.

Examples of the fungicides of the present invention, their structural formulae, and references to their preparation are as follows:

1. o-Aminobenzenethiol hydrochloride

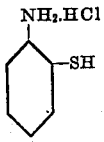

A. W. Hoffman; Beilstein, 4th ed., 13, 397.

2. o-Aminobenzenethiol sulfate

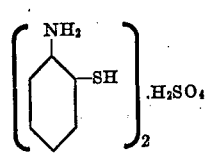

Prepared from the o-aminobenzenethiol hydrochloride by treating with sodium bicarbonate to free the o-aminobenzenethiol, and then adding sulfuric acid.

3. p-Aminobenzenethiol hydrochloride

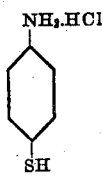

Hinsberg; Beilstein, 4th ed., 13, 533.

4. 2-amino-4-chlorobenzenethiol hydrochloride

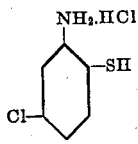

Pollack et al., Monatsch, 49, 213–228.

5. o-Aminobenzenthiol zinc salt

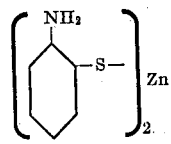

6. 2,2'-dithiodianiline

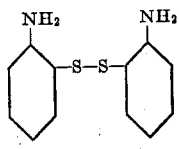

A. W. Hoffman, Beilstein, 4th ed., 13, 400.

7. 4,4'-dichloro-2,2'-dithiodianiline or 2,2'-dithiodi(4-chloroaniline)

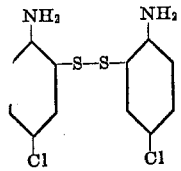

Pollack et al., Monatsch, 49, 213–228.

8. 4,4'-dithiodianiline

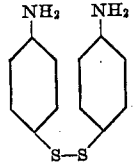

9. 1-aminonaphthalene-2-thiol

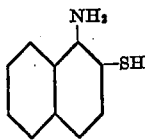

A. W. Hoffman, Beilstein, 4th ed., 13, 681.

10. 2,2'-dithiobis-(1-naphthylamine)

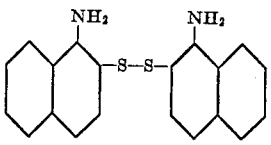

Jacobson, Beilstein, 4th ed., 13, 681.

11. 4-aminonaphthalene-1-thiol

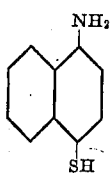

Zincke and Schutz, Beilstein, 4th ed., 13 Supplement, 270.

12. 4,4'-dithiobis-(1-naphthylamine)

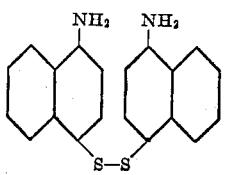

Zincke and Schutz, Beilstein, 4th ed., 13 Supplement, 271.

The compounds may be used as seed protectants, and to protect plants, which term includes plant parts, or soil from microorganisms harmful to seeds and plants. They may also be applied to prevent or retard fungus growth and the formation of, for example, mildew on organic material such as rope, wood, fur, hair, feathers, cotton, wool, leather, paints, varnishes and the like. They may be applied as a dust, undiluted or mixed with a powdered solid carrier, such as clay or talc, or as a liquid or a spray in a liquid carrier, as in solution in a suitable solvent, or suspended in a suitable non-solvent, for example, water. Preferably when applied from solution or suspension in a liquid carrier, the composition contains a surface-active agent which acts as a wetting or dispersing agent for the chemicals. They may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compounds may be used admixed with carriers that are active of themselves, for example, other fungicides, or bactericides, insecticides, insectifuges, fertilizers, hormones, buffering or softening agents.

The following examples are given to illustrate the invention:

*Example I*

Pea seed (variety Perfection) were tumbled with a given percentage by weight in dust form of various of the aromatic compounds set forth above. The seeds were then planted in greenhouse soil known to be infested with a number of fungus species harmful to seeds and plants, including *Pythium ultimum*. In each case an equivalent number of untreated seeds were planted at the same time. The effectiveness of the chemicals as fungicides was determined by comparing, ten days after planting, the percentage of treated and untreated seeds which germinated and grew (per cent stand). The results are shown in the following table:

| Chemical | Dosage in Per Cent Seed Wgt. | Per Cent Stand after 10 Days | |
|---|---|---|---|
| | | Treated | Untreated |
| 2,2'-dithiodianiline | 1.0 | 92 | 12 |
| Do | 0.125 | 63 | 11 |
| o-Aminobenzenethiol hydrochloride | 0.5 | 88 | 37 |
| Do | 0.125 | 71 | 28 |
| o-Aminobenzenethiol sulfate | 1.0 | 79 | 33 |

*Example II*

The toxicity of the chemicals of the invention to the spores of the fungus *Sclerotinia fructicola* was measured according to the methods described by S. E. A. McCallan, et al. in Contributions Boyce Thompson Institute 4, 233 (1932); 9, 249 (1938); 10, 329 (1939); 12, 49 (1941); 12, 431 (1942). Various concentrations of the different chemicals in water, defined as parts per million (P. P. M.), were tested using the "slide technique" described in the above references. The percent kill of the fungus, designated as "Ungerminated Spores (percent)," are shown in the following table:

| Chemical | Conc. of Chem., P.P.M. | Ungerminated Spores, Per Cent | |
|---|---|---|---|
| | | Treated | Untreated |
| 2,2'-dithiodianiline | 50 | 100 | 0 |
| Do | 5 | 98 | 0 |
| o-Aminobenzenethiol hydrochloride | 8 | 100 | 0 |
| o-Aminobenzenethiol sulfate | 500 | 100 | 0 |
| o-Aminobenzenethiol zinc salt | 100 | 100 | 0 |
| 2-amino-4-chlorobenzenethiol hydrochloride | 50 | 98 | 0 |

*Example III*

A piece of 8-ounce cotton duck was immersed in a 1% by weight solution of 2,2'-dithiodianiline in acetone until it was completely impregnated with the solution. Thereafter it was removed from the acetone solution and dried at room temperature to completely remove the acetone. A portion of the treated duck was leached with running water for 24 hours. The treated pieces of duck, with and without the water leaching treatment, and a piece of duck not treated with any chemical (check) were inoculated with *Chaetomium globosum* spore suspension and incubated for 30 days. At the end of the incubation period, it was observed that the two pieces treated with 2,2'-dithiodianiline, one of which was subsequently leached in water and the other not so leached, were free of fungus growth, whereas the untreated check piece was heavily overgrown with fungus.

*Example IV*

A piece of 8-ounce cotton duck was immersed in a 1% by weight solution of 2,2'-dithiodianiline in acetone until it was completely impregnated, thereafter removed and allowed to dry in air to remove the solvent. The piece was then buried ¼ inch deep in greenhouse soil known to be infested with cellulose-decomposing organisms. A sample of the cotton duck not treated with any chemical (check) was similarly buried at the same time. At the end of a two weeks' burial, it was observed that the chemically treated piece was free of fungus growth and had retained over 90% of its original bursting strength, whereas the untreated (check) piece was heavily overgrown with fungus and had retained only about 15% of its original bursting strength.

Example V

A piece of cotton duck was impregnated with a 1% by weight solution of o-aminobenzenethiol hydrochloride in 95% ethyl alcohol, and dried and inoculated and incubated together with an untreated check piece as in Example III. At the end of the 30 day incubation period, it was observed that the treated piece was free of any fungus growth whereas the untreated check piece was heavily overgrown with fungus.

Example VI

A piece of cotton duck was impregnated with a 2% by weight suspension of o-aminobenzenethiol sulfate in water containing a small amount of commercial surface active agent as a dispensing agent. The piece was removed, dried, and inoculated and incubated together with an untreated check piece as in Example III. At the end of the 30 day incubation period, it was observed that the treated piece was free of any fungus growth whereas the untreated check piece was heavily overgrown with fungus.

In treatment by impregnation methods, for example in the mildewproofing of wood, cotton textiles, leather, and the like, where it is desired that the final deposit be a heavy metal salt of an aminoaryl mercaptan, a two-bath impregnation system may be used to deposit the salt in-situ. Thus one bath may be an aqueous bath containing the appropriate primary aminoaryl mercaptan, or a water-soluble salt or an acid-addition product thereof, and the other bath may be an aqueous bath containing a soluble salt of the appropriate heavy metal.

Having thus described my invention, what I claim and desire to protect by Letters Patent is:

1. A fungicidal composition comprising as an active ingredient material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides, and a carrier therefor selected from the group consisting of clay and talc, and water containing a dispersing agent.

2. A fungicidal composition comprising 2,2'-dithiodianiline as an active ingredient and a carrier therefor selected from the group consisting of clay and talc, and water containing a dispersing agent.

3. A fungicidal composition comprising a powdered solid carrier and as an active ingredient material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

4. A fungicidal composition comprising a powdered solid carrier and 2,2'-dithiodianiline as an active ingredient.

5. A fungicidal composition comprising an aqueous suspension of material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides, said aqueous suspension containing a dispersing agent.

6. A fungicidal composition comprising an aqueous suspension of 2,2'-dithiodianiline, said aqueous suspension containing a dispersing agent.

7. The method of protecting organic material susceptible to attack by microorganisms which comprises treating said organic material with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

8. The method of protecting organic material susceptible to attack by microorganisms which comprises treating said organic material with 2,2'-dithiodianiline.

9. The method of controlling fungi on plants which comprises treating plants with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

10. The method of protecting seeds, plants and soil subject to attack or infestation by fungi which comprises treating said material with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

11. The method of protecting seeds, plants and soil subject to attack or infestation by fungi which comprises treating said material with 2,2'-dithiodianiline.

12. The method of immunizing seed which comprises treating said seed with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

13. The method of immunizing seed which comprises treating said seed with 2,2'-dithiodianiline.

14. The method of controlling fungi on living organisms which comprises treating said organisms with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

15. The method of destroying fungus which comprises subjecting said fungus to the action of material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

16. The method of controlling mildew on organic material susceptible to attack by mildew which comprises treating said organic material with material selected from the group consisting of the primary aminoaryl mercaptans and di(primary aminoaryl) disulfides of the benzene and naphthalene series, salts of said mercaptans, and acid addition products and ring-halogen substitution products of said mercaptans and said disulfides.

17. The method of controlling mildew on organic material which comprises treating said organic material with 2,2'-dithiodianiline.

ELBERT C. LADD.

REFERENCES CITED

The following references are of record in the file of this patent:

UNITED STATES PATENTS

| Number | Name | Date |
|---|---|---|
| 2,123,929 | Bousquet | July 19, 1938 |

OTHER REFERENCES

Beilstein, volume 13 (1930 edition), pages 397, 400, 533, and 681. Volume 13 Supplement (1933), pages 270, 271.

Monatsch 49, pages 23–229. (Copies in Patent Office Library.)